(12) United States Patent
Liu et al.

(10) Patent No.: US 12,375,830 B2
(45) Date of Patent: Jul. 29, 2025

(54) OPERATION METHOD TO MITIGATE LAG ISSUE WITH HIGH K METAL-INSULATOR-METAL (MIM) CAPACITOR

(71) Applicant: OMNIVISION TECHNOLOGIES, INC., Santa Clara, CA (US)

(72) Inventors: Yuanliang Liu, Santa Clara, CA (US); Bill Phan, Santa Clara, CA (US); Duli Mao, Santa Clara, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 133 days.

(21) Appl. No.: 18/488,492

(22) Filed: Oct. 17, 2023

(65) Prior Publication Data

US 2025/0126373 A1   Apr. 17, 2025

(51) Int. Cl.
*H04N 25/59* (2023.01)
*H04N 25/709* (2023.01)
*H04N 25/77* (2023.01)

(52) U.S. Cl.
CPC ........... *H04N 25/59* (2023.01); *H04N 25/709* (2023.01); *H04N 25/77* (2023.01)

(58) Field of Classification Search
CPC ....... H04N 25/59; H04N 25/709; H04N 25/77
See application file for complete search history.

(56) References Cited

U.S. PATENT DOCUMENTS

| | | | |
|---|---|---|---|
| 6,061,092 A | 5/2000 | Bakhle et al. | |
| 6,144,408 A | 11/2000 | MacLean | |
| 6,649,950 B2 | 11/2003 | He et al. | |
| 7,105,878 B2 | 9/2006 | He et al. | |
| 7,368,772 B2 | 5/2008 | He et al. | |
| 9,426,394 B2 | 8/2016 | Kim et al. | |
| 9,826,178 B2 | 11/2017 | Beck | |

(Continued)

FOREIGN PATENT DOCUMENTS

WO    2005057903 A2    6/2005

OTHER PUBLICATIONS

Iida, S., et al., "A 0.68e-rms Random-Noise 121d8 Dynamic-Range Sub-pixel architecture CMOS Image Sensor with LED Flicker Mitigation," San Francisco, CA, Dec. 1-5, 2018, 2018 IEEE International Electron Devices Meeting (IEDM), pp. 221-224.

*Primary Examiner* — Nhan T Tran
(74) *Attorney, Agent, or Firm* — Christensen O'Connor Johnson Kindness PLLC

(57) ABSTRACT

Image sensors with improved memory effect are disclosed herein. In one embodiment, a method for reducing image lag associated with a pixel included in a plurality of pixels is described. The pixel includes a photodiode, a first floating diffusion coupled to the photodiode through a transfer transistor, a second floating diffusion coupled to the first floating diffusion through a dual floating diffusion transistor, and a lateral overflow integration capacitor coupled between the second floating diffusion and a bias voltage source. The lateral overflow integration capacitor is further coupled to a pixel reference voltage source through a reset transistor. Operation of the pixel comprises an idle period and an integration period after the idle period. The method also includes configuring the lateral overflow integration capacitor to be either zero-biased or forward-biased during the idle period.

20 Claims, 11 Drawing Sheets

(56) References Cited

U.S. PATENT DOCUMENTS

| | | |
|---|---|---|
| 10,079,261 B1 | 9/2018 | Wang et al. |
| 10,103,193 B1 | 10/2018 | Manabe et al. |
| 10,750,108 B2 | 8/2020 | Mikes |
| 11,140,352 B1 | 10/2021 | Dai et al. |
| 11,736,833 B1 * | 8/2023 | Choi ............... H04N 25/77 348/308 |
| 11,765,484 B1 * | 9/2023 | Choi ............... H04N 25/77 348/308 |
| 2004/0263648 A1 | 12/2004 | Mouli |
| 2013/0188085 A1 | 7/2013 | Shim et al. |
| 2017/0054931 A1 | 2/2017 | Wang et al. |
| 2017/0289475 A1 | 10/2017 | Ha et al. |
| 2020/0260034 A1 | 8/2020 | Moue et al. |
| 2021/0144319 A1 | 5/2021 | Innocent et al. |
| 2021/0243393 A1 | 8/2021 | Yonemoto |
| 2021/0289154 A1 | 9/2021 | Johnson et al. |
| 2021/0377434 A1 | 12/2021 | Matsumoto |
| 2022/0013551 A1 | 1/2022 | Mun et al. |
| 2022/0191416 A1 * | 6/2022 | Fowler ............... H04N 25/78 |
| 2023/0300493 A1 * | 9/2023 | Uno ............... H10F 39/813 348/207.99 |

\* cited by examiner

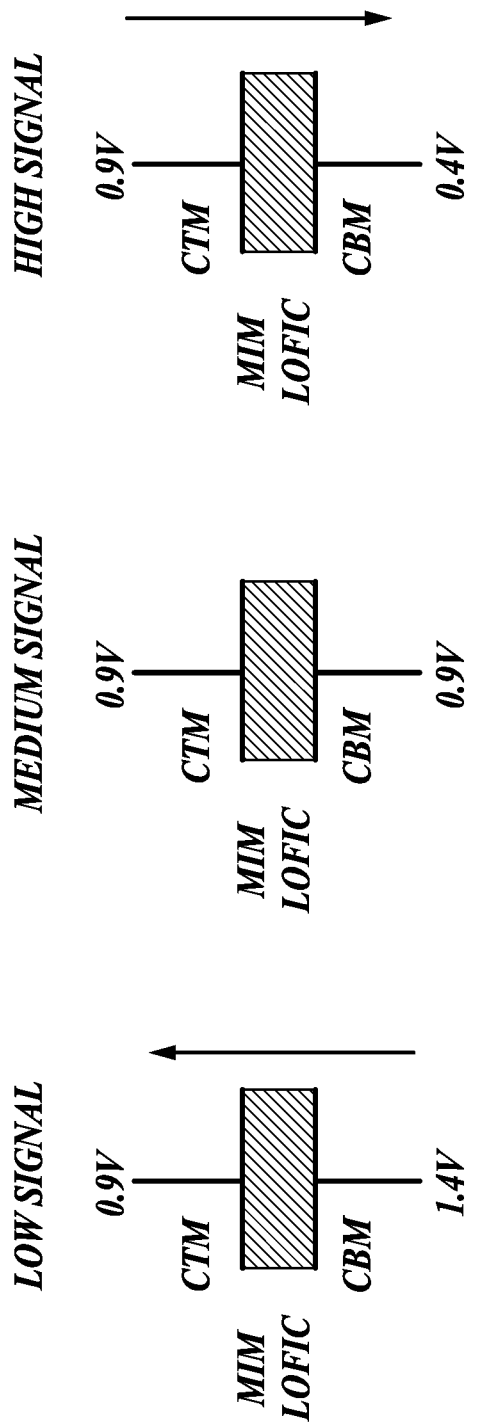

OPERATION METHOD TO MITIGATE LAG ISSUE WITH HIGH K METAL-INSULATOR-METAL (MIM) CAPACITOR

BACKGROUND INFORMATION

Field of the Disclosure

This disclosure relates generally to image sensors, and particularly but not exclusively, relates to pixel cells having a reduced time lag after the pixel cells are exposed to light.

Background

CMOS image sensors (CIS) have become ubiquitous. They are widely used in digital still cameras, cellular phones, security cameras, as well as medical, automobile, and other applications. Image sensor operates in response to image light coming from an external scene and being incident upon the image sensor. An image sensor includes an array of pixels having photosensitive elements (e.g., photodiodes) that absorb a portion of the incident image light and in response generate corresponding electrical charge. The electrical charge of individual pixels may be measured as an output voltage of each photosensitive element. In general, the output voltage varies as a function of the intensity and duration of the incident light. The output voltage of individual photosensitive elements is used to produce a digital image (i.e., image data) representing an external scene.

Image sensor technology has continued to advance at a great pace. The demands of higher resolution and lower power consumption have encouraged further miniaturization and integration of these devices having high dynamic range and low light sensitivity. For example, image sensors in some automotive products use high-k (high dielectric constant) metal-on-metal (MIM) capacitor process to improve capacitance of the high lateral overflow integration capacitor (LOFIC). As a result, dynamic range of the image sensor is improved. However, use of the high-k capacitor may cause image lag, for example after a bright image is taken by the image sensor, which negatively affects image sensor's performance. Therefore, systems and methods are needed for reduced image lag of the image sensors employing high-k capacitor as LOFIC to realize high dynamic performance.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

FIGS. 7A-7C illustrate sample voltages of high-k (high dielectric constant) metal-on-metal (MIM) capacitor in accordance with embodiments of the present disclosure.

Figure 1:
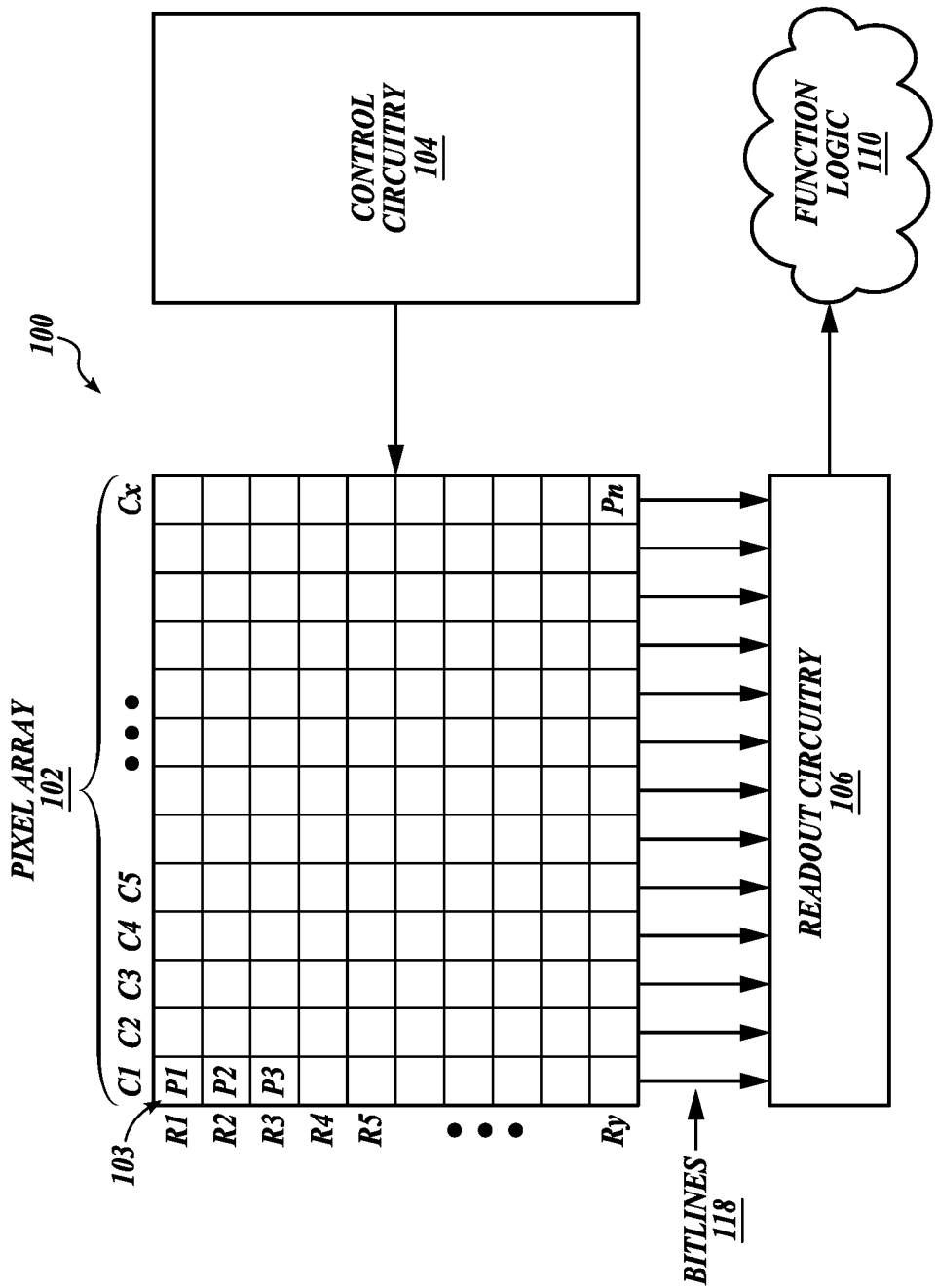
FIG. 1 illustrates an imaging system according to an embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Apparatuses and methods directed to lag time effect of image sensors are disclosed. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

Briefly, image sensors may use high-k metal-insulator-metal (MIM) capacitor process to form lateral overflow integration capacitor (LOFIC) with higher capacitance thus increasing dynamic range of the image sensor. Such image sensors are used, for example, in the automotive industry where a high dynamic range is needed to span use cases ranging from driving during the night with little outside light to driving during a very bright day. However, the high-k MIM capacitors may suffer from high image lag, meaning that, after the pixel is exposed to the light, the high-k MIM capacitor requires a relatively long time to discharge to its initial value and thus become ready for the next exposure of the pixel to light. For example, the image lag caused by the high-k MIM capacitor may be caused by trapping electrical charges within material having high dielectric constant (or high-k material) included in the insulation material of high-k MIM capacitor due to the hysteresis characteristics and slow relaxation behavior of high-k materials, during the pixel integration period under bright lighting condition, which then takes a relatively long time (e.g., longer idle time) to discharge during material relaxation, after which the acquisition of the next frame commences during the next integration period. In some embodiments, a discharge time of the high-k MIM may be about 400 ms, which is significantly longer than a typical frame time of 33 ms of the image sensor itself, hence resulting in image lag artifacts. Furthermore, in many practical applications, the lag time should be reduced even more, for example, to below 20 ms. Consequently, as the capacitances of LOFICs in pixel circuits increase, image lag increases, which may lead to slower frame rates.

Generally, high-k MIM LOFIC capacitor lag time necessitates longer idle time to discharge the capacitor. In some embodiments of the inventive technology, during the idle period the high-k MIM LOFIC capacitor is biased to a voltage bias that is of opposite sign than the voltage bias at the end of the integration time. Such an inversion of the voltage bias can reduce the accumulated electric charges, which speeds up the discharge process of the high-k MIM LOFIC capacitor, therefore enabling a shorter idle time and, conversely, higher frame rate of the image sensor. However, this approach may result in, for example, a worsened dark image non-uniformity (DINU) that interferes with machine vision application.

With some embodiments of the inventive technology, the high-k MIM LOFIC capacitor progresses through both negative and positive biases during the integration period to mitigate the issue with image lag. Furthermore, because the voltage bias of the high-k MIM LOFIC capacitor may start from a negative bias, and then transit to a positive bias as more charges are photo-generated by the photodiode and overflowed to the high-k MIM LOFIC capacitor during integration period, the reduced final voltage bias of the high-k MIM LOFIC reduces the image lag. Accordingly, the image sensor can operate at a higher frame rate, because only shorter idle time needs to be allocated for discharging the high-k MIM LOFIC capacitor.

FIG. 1 illustrates an example imaging system 100 in accordance with an embodiment of the present disclosure. The imaging system 100 includes a pixel array 102, a control circuitry 104, a readout circuitry 106 and a function logic 110. In one example, the pixel array 102 is a two-dimensional (2D) array of photodiodes or image sensor pixels 112 (e.g., pixels P1, P2 . . . , Pn). As illustrated, the photodiodes are arranged into rows (e.g., rows R1 to Ry) and columns (e.g., column C1 to Cx). In operation, the photodiodes or image sensor pixels 112 acquire image data of an outside scene in response to incoming light detected, which can then be used to render a 2D image of the person, place, object, etc. However, in other embodiments the photodiodes or image sensor pixels 112 may be arranged into configurations other than rows and columns.

As will be discussed, in the various embodiments, one or more photodiodes or image sensor pixels 112 are also be configured to provide HDR image signals, in which case, the image charge generated by the one or more photodiodes or image sensor pixels 112 in bright lighting conditions may also be transferred to coupled LOFICs and/or an additional floating diffusion in each pixel circuit associated with one or more photodiodes or image sensor pixels 112 to store the image charge. For example, each of pixel circuits associated with one or more photodiodes or image sensor pixels 112 may include a LOFIC (e.g., high-k based MIM capacitor) configured to store overflow image charge received from coupled one or more photodiodes. In the various embodiments, readout circuit 106 may be configured to read out the image signals at different conversion gains through column bitlines 118.

In an embodiment, after each photodiode or image sensor pixel 112 in the pixel array 102 acquires its image charge, the image data is read out by the readout circuitry 106 via bitlines 118, and then transferred to a function logic 110. In various embodiments, the readout circuitry 106 may include signal amplifiers, analog-to-digital (ADC) conversion circuitry and data transmission circuitry. The function logic 110 may store the image data or even manipulate the image data by applying post image effects (e.g., crop, rotate, remove red eye, adjust brightness, adjust contrast, or otherwise). In some embodiments, the control circuitry 104 and function logic 110 may be combined into a single functional block to control the capture of images by the photodiodes or image sensor pixels 112 and the readout of image data from the readout circuitry 106. The function logic 110 may be a digital processor, for example. In one embodiment, the readout circuitry 106 may read one row of image data at a time along readout column lines (bitlines 118) or may read the image data using a variety of other techniques, such as a serial readout or a full parallel readout of all pixels simultaneously (not illustrated).

In one embodiment, the control circuitry 104 is coupled to the pixel array 102 to control operation of the plurality of photodiodes or image sensor pixels 112 in the pixel array 102. For example, the control circuitry 104 may generate a shutter signal for controlling image acquisition. In one embodiment, the shutter signal is a global shutter signal for simultaneously enabling all photodiodes or image sensor pixels 112 within the pixel array 102 to simultaneously capture their respective image data during a single data acquisition window. In another embodiment, the shutter signal is a rolling shutter signal such that each row, column, or group of pixels is sequentially enabled during consecutive acquisition windows. In another embodiment, image acquisition is synchronized with lighting effects such as a flash. In one or more embodiments, the control circuit 104 may include circuitries for modulating or adjusting voltage level of bias voltage provides to the LOFICs associated with the plurality of photodiodes or image sensor pixels 112.

In one embodiment, readout circuitry 106 includes analog-to-digital converters (ADCs), which convert analog image data received from the pixel array 102 into a digital representation. The digital representation of the image data may be provided to the function logic 110. In some embodiments, the data transmission circuitry 108 may receive the digital representations of the image data from the ADCs in parallel and may provide the image data to the function logic 110 in series.

In one example, imaging system 100 is implemented on a single semiconductor wafer. In another example, imaging system 100 is on stacked semiconductor wafers. For example, pixel array 102 can be implemented on a pixel wafer, while readout circuit 106, control circuit 104, and function logic 110 can be implemented on an application specific integrated circuit (ASIC) wafer, where the pixel wafer and the ASIC wafer are interconnected by bonding (hybrid bonding, oxide bonding, or the like) or one or more through substrate vias (TSVs). In another example, pixel array 102 and control circuit 104 are implemented on a pixel wafer, while readout circuit 106 and function logic 110 are implemented on an ASIC wafer, where the pixel wafer and the ASIC wafer are stacked and interconnected by bonding (hybrid bonding, oxide bonding, or the like) or one or more TSVs.

In different embodiments, imaging system 100 may be included into a digital camera, cell phone, laptop computer, an endoscope, a security camera, an imaging device for a head-mounted display device or an imaging device for automobile or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

Figure 2:
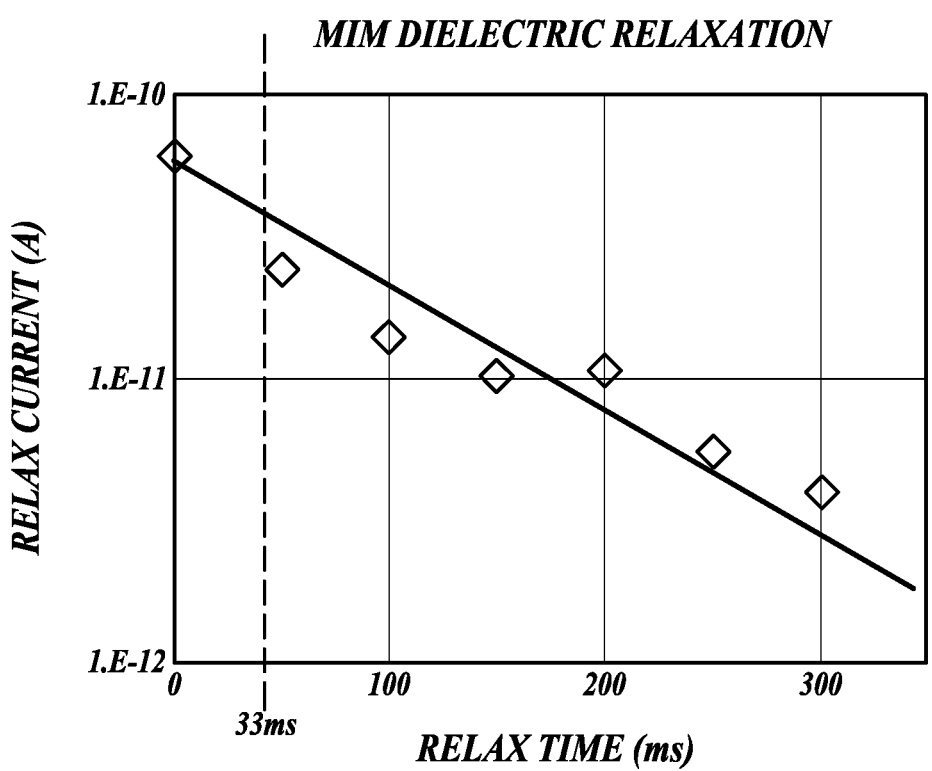
FIG. 2 is a graph of dielectric relaxation in accordance with an embodiment of the present disclosure.

FIG. 2 is a graph of dielectric relaxation in accordance with an embodiment of the present disclosure. The horizontal axis indicates relaxation time for a high-k MIM LOFIC capacitor in milliseconds (ms), and the vertical axis indicates relaxation current in Amperes. In general, higher relaxation current requires shorter relaxation time for the same charge accumulated or stored in a high-k MIM LOFIC. For example, as the relaxation current decreases from about 7 E-11 A to about 3 E-12 A, the relaxation time for the illustrated high-k MIM LOFIC capacitor increases to significantly above 33 ms, thus making the needed idle period of the image sensor for avoiding image lag impractically long, i.e., the frame rate of the image sensor is reduced to an unacceptably small value. As discussed above, for many applications the target relaxation time may be below 33 ms or even below 20 ms. Some embodiments of the inventive technology that reduce the lag time are discussed below.

Figure 3:
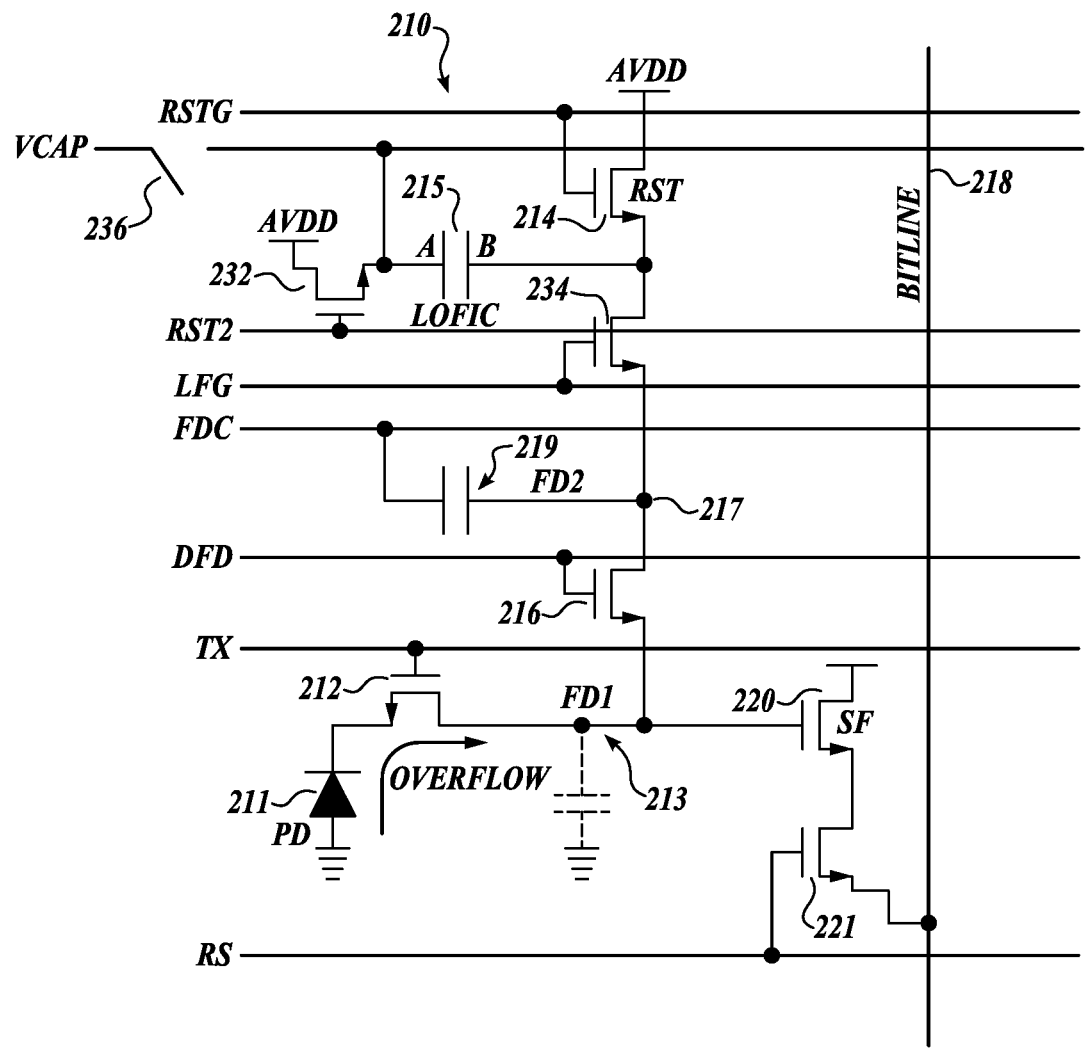
FIG. 3 is an electrical schematics of a pixel in accordance with an embodiment of the present disclosure.

FIG. 3 is an electrical schematics of a pixel 210 in accordance with an embodiment of the present disclosure. The pixel 210 may be coupled to a bitline 218, e.g., a readout column that provides image data to readout circuitry, such as the readout circuitry 106. In operation, the pixel 210 may receive control signals from control circuitry, such as the control circuitry 104, to control the operation of a plurality of transistors included in the pixel 210. The control circuitry may control the operation of the plurality of transistors in desired sequences with relative timing that assures an ordered read out of the image data. Voltages provided to different elements of the pixel 210 are listed on the left-hand side of the circuit, however, in different embodiments, the differently annotated voltages may have same or different values.

The illustrated embodiment of the pixel 210 includes a photodiode (PD) 211, a first floating diffusion (FD1) 213, a transfer transistor 212, a dual floating diffusion transistor 216, a second floating diffusion (FD2) 217 connected to a lateral overflow integration capacitor (LOFIC) 215, a lateral overflow gate transistor 234, a reset (RST) transistor 214, a row select transistor 221, and a source follower (SF) transistor 220. The transfer transistor 212, which may also be referred to as a transfer gate 212, is coupled between the photodiode 211 and the first floating diffusion FD1 213 controlling charge transfer operation between the photodiode 211 and the first floating diffusion FD1 213. The transfer transistor 212 operates based on a transfer control signal TX applied to its gate terminal. The transfer transistor 212 is configured to be switched in response to the transfer control signal TX received. In the illustrated embodiments, the first floating diffusion FD1 213 is depicted as a capacitor coupled to transfer transistor 212 in schematic of FIG. 3, and the dual floating diffusion transistor 216 selectively coupling the first floating diffusion FD1 213 to a capacitor 219. In some embodiments, the capacitor 219 is coupled to receive an optional floating diffusion capacitance control signal FDC and coupled to the first floating diffusion FD1 213 through the dual floating diffusion transistor 216. In one example, the floating diffusion capacitance control signal FDC may be utilized to provide a boost control signal to the capacitors 219 coupled to the first floating diffusions FD1 213. In embodiments, the combination of first floating diffusion FD1 213 and second floating diffusion FD2 (or floating node FD2) may also be collectively referred to as a floating diffusion associated with pixel 210. It is appreciated that the capacitor 219 may be formed of a junction capacitor metal-oxide-metal capacitor, or a metal-insulator-metal capacitor.

The coupling of the second floating diffusion FD2 217 to the first floating diffusion FD1 213 while the dual floating diffusion transistor 216 is enabled (e.g., turned on) may provide additional capacitance to store the charge(s) photo-generated by the photodiode 211 and modulating a conversion gain of the pixel 210. For example, when the transfer transistor 212 is enabled to transfer image charge accumulated by the photodiode 211 to the first floating diffusion FD1 213, the dual floating diffusion transistor 216 and may be enabled to couple the LOFIC 215 to the first floating diffusion FD1 213 providing additional capacitance to increase an overall charge capacity of the first floating diffusion FD1 213. In some embodiments, the bias voltage VCAP may be provided by a bias voltage source and configured to provide different voltage levels depending on whether the operation of the pixel 210 e.g., whether pixel 210 has been selected to be active during integration period or read out period.

The RST transistor 214 may be coupled to receive a pixel reference voltage, e.g., voltage AVDD, and may be coupled to receive a reset control signal RSTG on its gate terminal. The reset transistor RST 214 is configured to be switched in response to the reset control signal RSTG and is configured to reset the pixel 210 during, for example, an idle period, a pre-charge period, and a readout period between image signal and reset signal readouts.

The LOFIC 215 may be coupled between a bias voltage VCAP and second floating diffusion FD2 217. In the context of this application, the bias voltage VCAP may be implemented by a source of variable voltage, by a combination of multiple voltage sources where individual voltage source may not be variable, or by other methods known to a person of ordinary skill. In an embodiment, the pixel reference voltage, e.g., voltage AVDD, is supplied by a pixel reference voltage source, which may be configured to provide a fixed voltage. In some embodiments, the LOFIC 215 may be manufactured as metal-on-metal (MIM) capacitor having an insulating material with high dielectric constant (e.g., high-k dielectric) sandwiched between a first metal electrode or plate and a second metal electrode or plate. In some embodiments, the LOFIC 215 may be manufactured as a trenched capacitor or stacked MIM capacitor within the metal layers that are disposed on a substrate or a wafer. For ease of referencing, the first metal electrode or plate of the LOFIC 215 may be designated as A-side or CTM (capacitor top metal) side, and the second metal electrode or plate of the LOFIC 215 may be designated as B-side or CTM (capacitor bottom metal) side. The A-side or CTM side of the LOFIC 215 is coupled to receive bias voltage VCAP. The A-side or CTM side of the LOFIC 215 is also coupled to receive the pixel reference voltage (e.g., voltage AVDD) through a second reset transistor 232. The second reset transistor 232 is configured to selectively couple the LOFIC 215 to the reference or pixel reference voltage (e.g., voltage AVDD in response to a second reset control signal RST2. The B-side or CBM of the LOFIC 215 is coupled to first floating diffusion FD1 213 (first floating diffusion). The B-side or CBM of the LOFIC 215 is coupled to a source of the reset transistor 214 and a drain of the lateral overflow gate transistor 234. In an example operation, during a reset or pre-charge period, the reset control signal RSTG is configured to turn on the reset transistor 214 and the second reset control signal RST2 is configured to turn on the second reset transistor 232 such that both the A-side or CTM side of the LOFIC 215 and B-side or CBM side of the LOFIC 215 are coupled receive the pixel reference voltage (e.g., voltage AVDD), for example from a pixel reference voltage source to ensuring zero-biasing across the LOFIC 215 to initiate a discharge process of LOFIC 215. In various embodiments, the insulating material disposed between the first metal electrode or plate and the second metal electrode or plate of the LOFIC 215 may be single layer of high-k material or a multiple layer stack depending on the needed LOFIC capacitance. In the various examples, high-k material may include one of aluminum oxide ($Al_2O_3$), Zirconium dioxide ($ZrO_2$), Hafnium oxide (HfO), or a combination thereof. In different embodiments, the LOFIC 215 can be biased through a bias voltage VCAP 236. Furthermore, the A-side of the LOFIC 215 may be reset to pixel reference voltage e.g., voltage AVDD (or other voltage provided to the source side of the second reset transistor 232.

As explained later with reference to FIGS. 4-9, the bias voltage VCAP coupled to the LOFIC 215 may be modulated during the idle period (before the integration period). In some embodiments, the bias voltage VCAP may be modulated between a high bias voltage VCAPHi (e.g., 2.8V) and a low bias voltage VCAPLo (e.g., around 0V). In embodiments, other voltage levels may be implemented depending on, for example, design and operation requirement of the image sensor. By controlling the voltage level of bias voltage VCAP, the voltage across the LOFIC 215 can be adjusted. In various embodiments, the bias voltage VCAP may be supplied by a bias voltage source included in the control circuit, such as the control circuitry 104, coupled to the pixel 210. It is also appreciated that in the various examples, the VCAPLO and VCAPHI bias voltage levels may be determined in consideration of the stable range of the high-k material.

Continuing discussion about circuitry of the pixel 210, the dual floating diffusion transistor 216 may be coupled between first floating diffusion FD1 213 and second floating diffusion FD2 217, and further coupled to receive a dual floating diffusion control signal DFD on its gate terminal. That is, dual floating diffusion transistor 216 is configured to be switched on in response to the dual floating diffusion control signal DFD and is configured to transfer image charge from the first floating diffusion FD1 213 to the second floating diffusion FD2 217 allowing image charges overflowing from the photodiode 211 to the second floating diffusion FD217 through the first floating diffusion FD1 213, for example when photodiode 211 is saturated or when charges generated exceed a full well capacity (FWC) of photodiode 211. The lateral overflow gate transistor 234 may be coupled between the FD2 217 and the LOFIC 215, and further coupled to receive a lateral overflow gate control signal LFG on its gate terminal. The lateral overflow gate transistor 234 is configured to be switched in response to the lateral overflow gate control signal LFG. Further, a gate terminal of the source follower transistor SF 220 is coupled to floating diffusion node FD1 213. The source/drain terminals of the source follower transistor SF 220 are coupled between the reference or pixel voltage (e.g., voltage AVDD) and the row select transistor. The row select transistor 221 may be coupled between the bitline 218 and the source follower SF transistor 220. The row select transistor 221 is configured to be switched in response to a row select control signal RS and is configured to selectively transfer signals from the source follower transistor SF 220 to the bitline 218. It is appreciated that the pixel 210 may include fewer, additional, and/or alternative components (e.g., transistors, capacitors, buffers, switches) depending on the particular requirements of the imaging system.

In operation, the transfer transistor 212 receives transfer control signal TX to enable charge transfer from the photodiode 211 to the first floating diffusion FD1 213, for example during charge transfer period after the integration period. In general, the amount of charge transfer depends on the light exposure of the photodiode 211 and operation of the pixel 210. In some embodiments, the capacitor 219 may be formed by the metallization that is present in the physical layout of the device. The transfer transistor 212, the dual floating diffusion transistor 216, and the lateral overflow gate transistor 234 are configured allowing excess photogenerated charges (e.g., generated in strong light condition) to overflow from the photodiode 211 to LOFIC 215. In some embodiments, LOFIC 215 may increase the charge storage capacity, e.g., capacitance, of the second floating diffusion FD2 217. For example, in response to high intensity illumination, the photodiode 211 may generate more charges than the first floating diffusion FD1 213 can store. The extra or excess charges may be stored by the LOFIC 215. In some embodiments, the bias voltage VCAP modulates how much charges can be stored by the LOFIC 215. In general, the first floating diffusion FD1 213 is read in conjunction with the high conversion gain (HCG) part of the data readout, while the second floating diffusion FD2 217 and floating diffusion 213 are read out in conjunction with the low conversion gain (LCG) part of the readout. Collectively, HCG and LCG readouts constitute a dual conversion gain (DCG) data readout.

In some embodiments, operation of the RST transistor 214 and the dual floating diffusion transistor 216 may reset the floating diffusion FD1 213 to a high voltage that represents a dark state, because photo-generated electrons, when transferred to the first floating diffusion FD1 213, decrease the voltage proportionally to the intensity of the photodiode PD 211 charge. To reset the first floating diffusion FD1 213, the RST transistor 214, lateral overflow gate transistor 234, and the dual floating diffusion transistor 216 are enabled (ON) by their respective control signals. In some embodiments, the RST transistor 214 may be in ON state, while the dual floating diffusion transistor 216 remains in OFF state, hence resetting the second floating diffusion FD2 217, but not resetting the first floating diffusion FD1 213. In embodiments, the second reset transistor 232 is configured to provide local resets to the coupled LOFIC 215, reduce the loading effect, and improve the settling time of the LOFIC 215.

Embodiment 1

Figure 4:
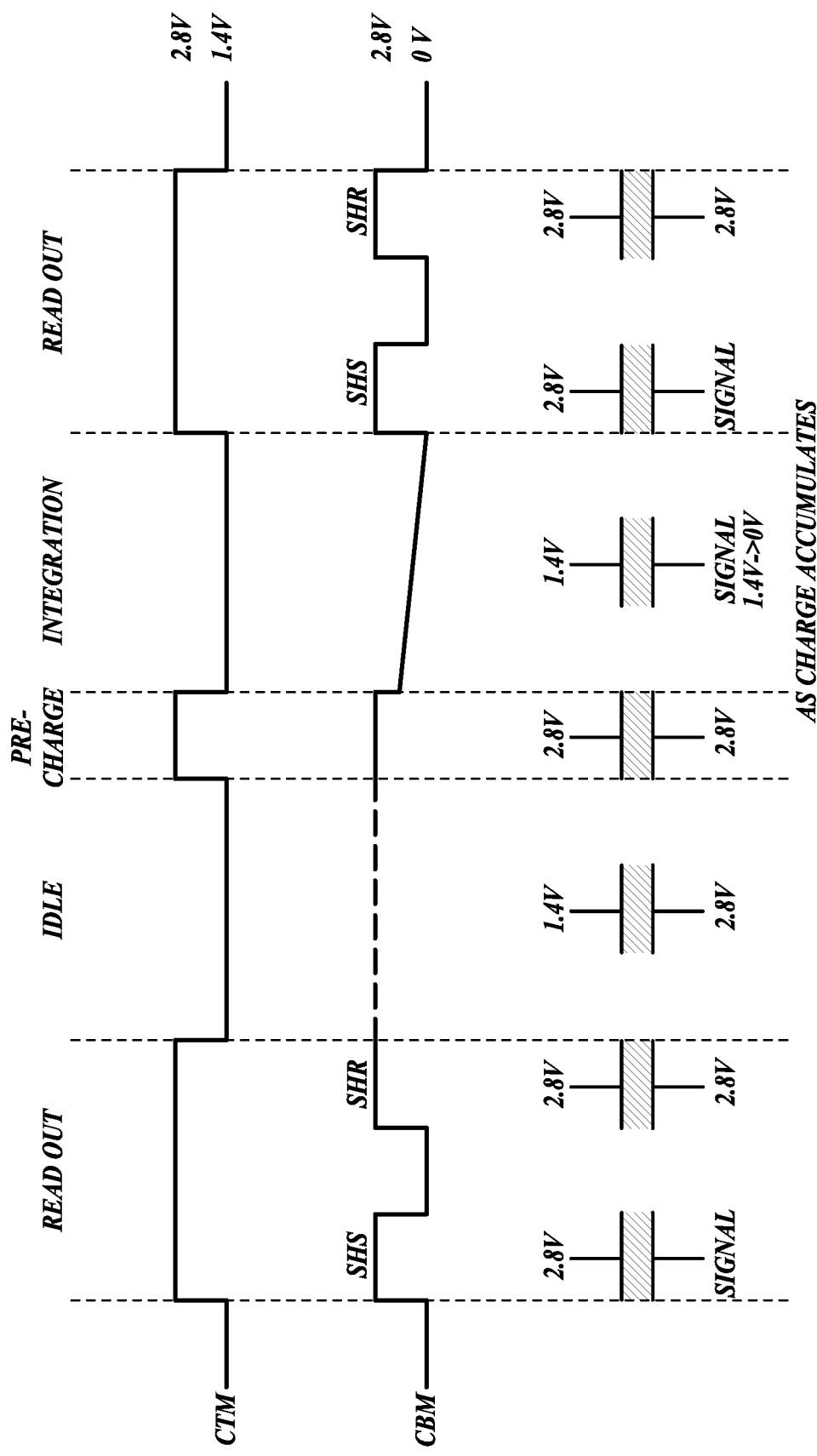
FIG. 4 is a timing diagram illustrating phases of image sensor operation in accordance with an embodiment of the present disclosure.

FIG. 4 is an example timing diagram illustrating operation of image sensor in accordance with an embodiment (e.g., FIG. 3) of the present disclosure. Voltages at the capacitor top metal electrode or plate (referring as CTM side or A-side) and the capacitor bottom metal electrode or plate (referring as CBM side or B-side) of a LOFC (e.g., LOFIC 215 of FIG. 3) are shown across different periods of the pixel operation cycle associated with a pixel: read out, idle, pre-charge, integration, the next readout for the next frame, etc. These different time periods are not drawn on scale. For example, in many embodiments the integration period may be significantly longer than other illustrated periods of the pixel operation cycle. The illustrated biasing voltage range across the LOFIC 215 may be from 0V to 2.8V, however, in different embodiments different operating voltage ranges may be applied to the CTM and CBM sides of the LOFIC 215, either through the configuration of the bias voltage VCAP that is applied to the CTM side, or through electrical charge accumulation (e.g., charges overflow from photodiode 211) on the CBM side. The row of capacitor images at the bottom of the graph represents the voltage biasing state across the LOFIC 215 at different periods of the pixel operation cycle. As explained above, the LOFIC 215 may be a high-k MIM capacitor i.e., a high-k dielectric sandwiched between a capacitor top metal electrode or plate (a first metal electrode or plate) and a capacitor bottom metal electrode or plate (a second metal electrode or plate).

It is appreciated that a bias voltage VCAP applied to the capacitor top metal electrode (or a first metal electrode) can be configured to forward bias, zero bias, or reverse bias the LOFIC 215, respectively, by adjusting the voltage values at the capacitor top metal electrode (or a first metal electrode) higher than, equal to, or lower than the voltage value at the capacitor bottom metal electrode (or the second metal electrode) at the floating node between the reset transistor 214 and the lateral overflow gate transistor 234 applied to the capacitor bottom metal electrode (or the second metal electrode). The voltage applied to the capacitor top metal electrode (or a first metal electrode) may be referred as the first bias voltage value and the voltage applied the capacitor bottom metal electrode (or the second metal electrode) may be referred as the second bias voltage value. The first bias voltage value at the capacitor top metal electrode can be configured to be higher than, equal to, or lower than the second bias voltage value at the capacitor bottom metal electrode.

For example, when the first bias voltage value at CTM side exceeds the second bias voltage value at CBM side, the LOFIC 215 is configured to be forward biased. Conversely, when the first bias voltage value at CTM side is smaller than the second voltage value at CBM side, the LOFIC 215 is configured to be reverse biased. When the first bias voltage value at CTM side is equal to the second bias voltage value at CBM side, the LOFIC 215 is configured to be zero biased.

In some embodiments, a control circuit (e.g., the control circuit 104 illustrated in FIG. 1) can include circuitries modulating the voltage level supplied by the bias voltage VCAP. In some embodiments, the bias voltage VCAP can be included on an ASIC wafer while the control circuit is included on a pixel wafer. In other embodiments, the bias voltage VCAP can be included on an ASIC wafer with the control circuit.

In some embodiments, during the idle period, the CTM side (A-side) of the LOFIC 215 is set at the first bias voltage value (e.g., 1.4V), for example by configuring the adjusting bias voltage and closing the switch 236 coupling the CTM side (A-side) of the LOFIC 215 to receive the bias voltage VCAP applying the first bias voltage value to the CTM side as shown in FIG. 3, while the CBM side (B-side) is at the second bias voltage value (e.g., 2.8V) that may be supplied by a pixel reference voltage (e.g., voltage AVDD) through the reset transistor 214. The voltage bias across the LOFIC 215 as aforementioned is defined as a difference between voltage at the CTM side (e.g., from the bias voltage VCAP) and a voltage at the CBM plate (e.g., a voltage at node between the reset transistor 214 and lateral overflow gate transistor 234). Therefore, during the idle period the LOFIC 215 may be reverse-biased to compensate residue charges accumulated from previous frame. For example, the LOFIC 215 may be biased with a voltage of −1.4V.

In the pre-charge period after the idle period, the LOFIC 215 may be configured to have zero-biased to start the discharge process.

In the beginning of the integration period, after the pre-charge (reset) period is completed, both the CTM side (A-side) and the CBM side (B-side) side of the LOFIC may be set to a common bias voltage e.g., 1.4V. The bias voltage at the CTM side (A-side) may be set by the action of the switch 236 with the bias voltage VCAP configured accordingly, and the second bias voltage value at the CBM side (B-side) may be set by the pixel reference voltage e.g., voltage AVDD through the reset transistor 214. Therefore, at the beginning of the integration period there is 0V voltage bias across the plates of the LOFIC 215 (i.e., the LOFIC 215 is zero-biased at the beginning of the integration period). As the electrical charges accumulate during the integration period (e.g., as excess photo-generated charges overflow from photodiode PD 211 to the LOFIC 215), the second bias voltage value at the CBM side of the LOFIC 215 decreases to a lower voltage value, for example 0V (for a strong light) at the end of the integration period, due to the negative charge generated by the photodiode PD 211 that is accumulated at the LOFIC 215. Therefore, in this example that is representative of a relatively bright external conditions, the LOFIC 215 may be forward biased to 1.4V at the end of the integration period.

The above voltage numbers are given as non-limiting examples. For example, the integration period does not necessarily end exactly with the CBM side of the LOFIC 215 being at 1.4V, causing the 0V bias. In different embodiments, the illustrated voltage values may vary, while still embodying the principle of operation that characterize these different embodiments.

The integration period is followed by the readout period, which may be immediately followed by another idle period for the next frame, and so on. Depending on the second bias voltage value at the CBM side of the LOFIC 215 at the end of the integration period corresponding to amount of charges accumulated in the LOFIC 215, the next idle period may require longer or shorter time for the LOFIC (e.g., a high-k MIM capacitor) to properly discharge, thus possibly causing high lag time between the pixel exposures. Some lag time scenarios are described with reference to FIGS. 5A and 5B below. For ease of referencing and without any loss of generality, the bias voltages across the LOFIC 215 illustrated in graphs in FIGS. 5A, 5B, 8A and 8B across the LOFIC 215 are shown as normalized to 1V to −1V.

Figure 5A:
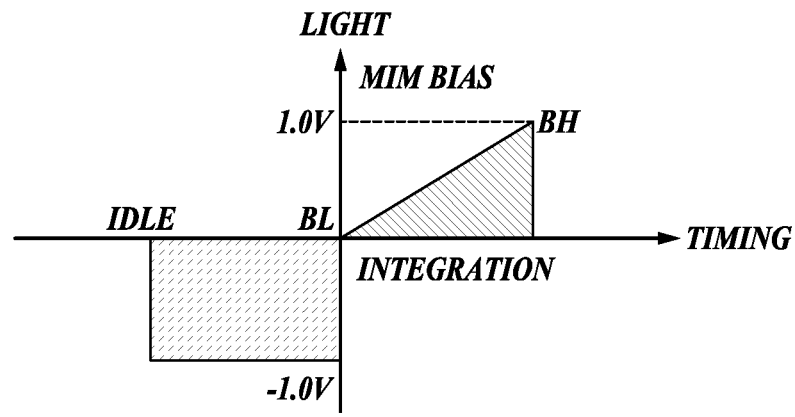
FIGS. 5A and 5B are timing graphs of high lateral overflow integration capacitor (LOFIC) voltage biasing in accordance with embodiments of the present disclosure.
Figure 5B:
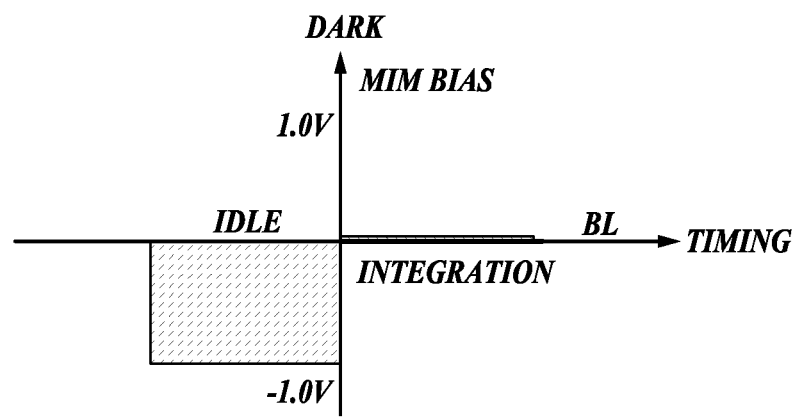

FIGS. 5A and 5B are timing graphs of LOFIC voltage biasing in accordance with embodiments of the present disclosure. In particular, FIG. 5A illustrates an example representation of voltage change across a LOFIC (e.g., LOFIC 215 of FIG. 3) during an integration period under a relatively light (bright) condition, while FIG. 5B illustrates an example representation of voltage change across the LOFIC (e.g., LOFIC 215 of FIG. 3) during the integration process under a relatively dark (low light) condition. In both cases, the horizontal axis represents time: idle period to the left of the coordinate origin and integration period to the right of the coordinate origin. The vertical axis represents voltage bias across the top and bottom metal electrodes or plates of the LOFIC (e.g., LOFIC 215 of FIG. 3), negative bias corresponding to the CTM side of the LOFIC (e.g., LOFIC 215 of FIG. 3) having lower voltage value than that of the CBM side of the LOFIC (e.g., the LOFIC is reversed-biased), and positive bias corresponding to the CTM side of the LOFIC having higher value than the CBM side of the LOFIC (e.g., the LOFIC is forward-biased). These voltage biases are represented within a range from about −1V (bias-low or BL) to about +1V (bias-high or BH), however, these values should be understood as merely representative voltage values and other values are possible in different embodiments, depending on the design of the image sensor and voltages provided to different nodes of the image sensor circuitry. Furthermore, in the context of this disclosure, the term "about," approximately" and similar means+/−5% of the stated value.

FIG. 5A illustrates voltage change of the LOFIC (e.g., LOFIC 215 of FIG. 3) during the integration process under a relatively light (bright) condition. At the beginning of the integration period, voltage bias BL across the top and bottom metal plates of the LOFIC is about 0V. As the LOFIC (e.g., LOFIC 215 of FIG. 3) accumulates electrical charges generated by the photodiode PD 211 during the integration period in response to amount of incident light, the LOFIC (e.g., LOFIC 215 of FIG. 3) becomes positively or forward biased, for example, the final voltage bias BH being positive 1V at the end of the integration period. The integration period is followed by a read out period, and then by the next idle period for the next frame. Since the LOFIC (e.g., LOFIC 215 of FIG. 3) becomes negatively biased to −1V at the beginning of the idle period, this negative bias actually speeds up the discharge of the positively biased LOFIC (e.g., LOFIC 215 of FIG. 3) by enabling charge compensation, therefore reducing the image lag associated with the LOFIC (e.g., a high-k MIM LOFIC capacitor such as LOFIC 215 of FIG. 3) and improving the frame rate of the image sensor.

FIG. 5B illustrates voltage change across the top and bottom metal electrodes or plates of LOFIC (e.g., LOFIC 215 of FIG. 3) during the integration period under a relatively dark (low light) condition. Just as in the case shown in FIG. 5A, the integration period starts at 0V voltage bias (BL) across the top and bottom metal electrodes or plates of the LOFIC (e.g., LOFIC 215 of FIG. 3). Because the LOFIC (e.g., LOFIC 215 of FIG. 3) has been negatively biased (reversed-biased) during an idle period just preceding integration period, charges that have been accumulated in the LOFIC (e.g., LOFIC 215 of FIG. 3) during that idle period may not be completely discharged. Thus, even though the photodiode PD 211 remains exposed to the dark field during the integration period, and the voltage of the photodiode remains 0V or close to 0V at the end of the integration period, in an absence of light e.g., the positive bias or forward biased operation during the integration period as illustrated in FIG. 5A, photo-generated charges accumulated in the LOFIC (e.g., LOFIC 215 of FIG. 3) during negative voltage biasing (reverse-biasing) operation in the idle period may not be canceled by charges accumulated during the positive voltage bias operation in the integration period. As a result, issue with image lag associated with the LOFIC (e.g., a high-k MIM LOFIC capacitor such as LOFIC 215 of FIG. 3) due to residue charges remaining in the LOFIC may still exist, which, as explained above, may affect overall image quality or operation of the image sensor by requiring longer idle period and, not able to have frame rate.

Embodiment 2

Figure 6A:
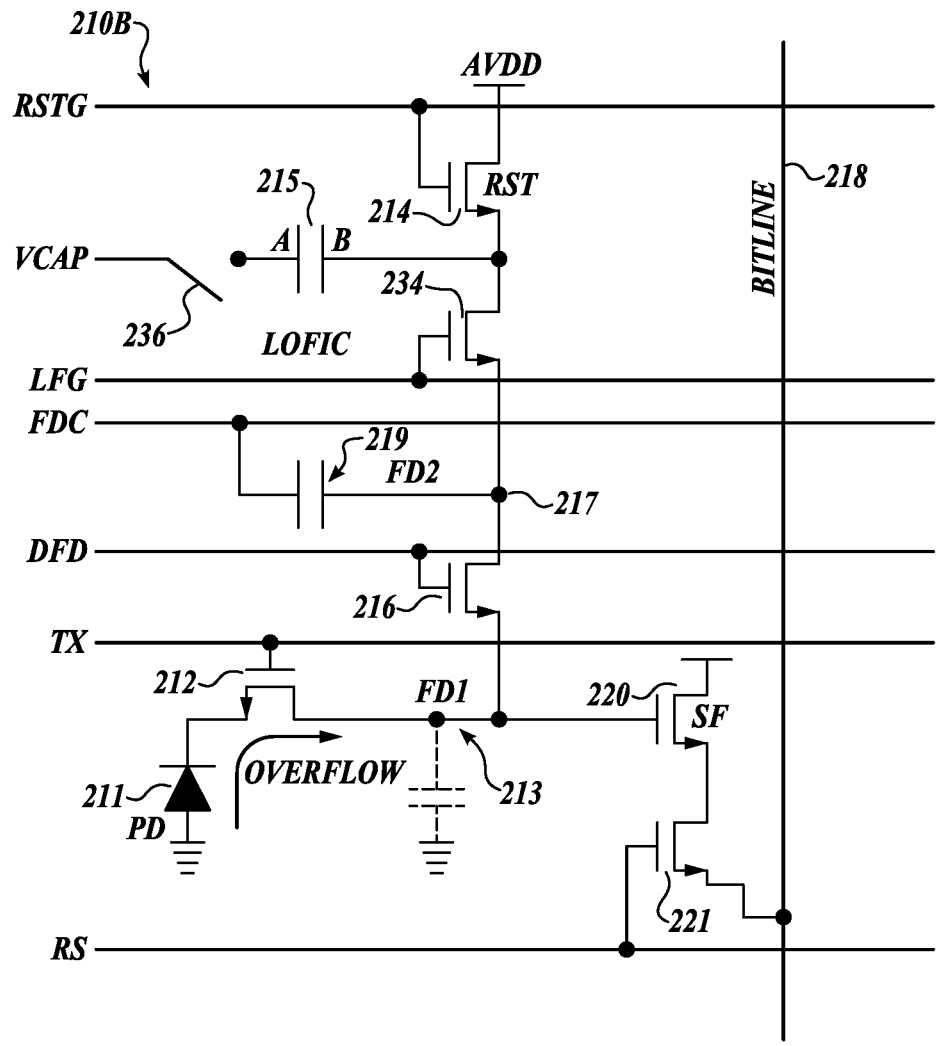
FIG. 6A is an electrical schematics of a pixel in accordance with embodiments of the present disclosure.

FIG. 6A is an electrical schematics of a pixel in accordance with embodiments of the present disclosure. The schematics illustrates a pixel circuitry with LOFIC. The voltage biasing operation apply to the LOFIC may be relatively easy to incorporate into an existing image sensor product, because here only the biasing operation of the bias voltage VCAP needs to be configured in comparison to the pixel schematics shown in FIG. 3, for example additional transistor for local reset needs to be added. In some embodiments, such an update may be accomplished by tuning the design of an existing application specific integrated circuit (ASIC) that embodies the pixel control circuitry (e.g., control circuitry 104 of FIG. 1).

Figure 6B:
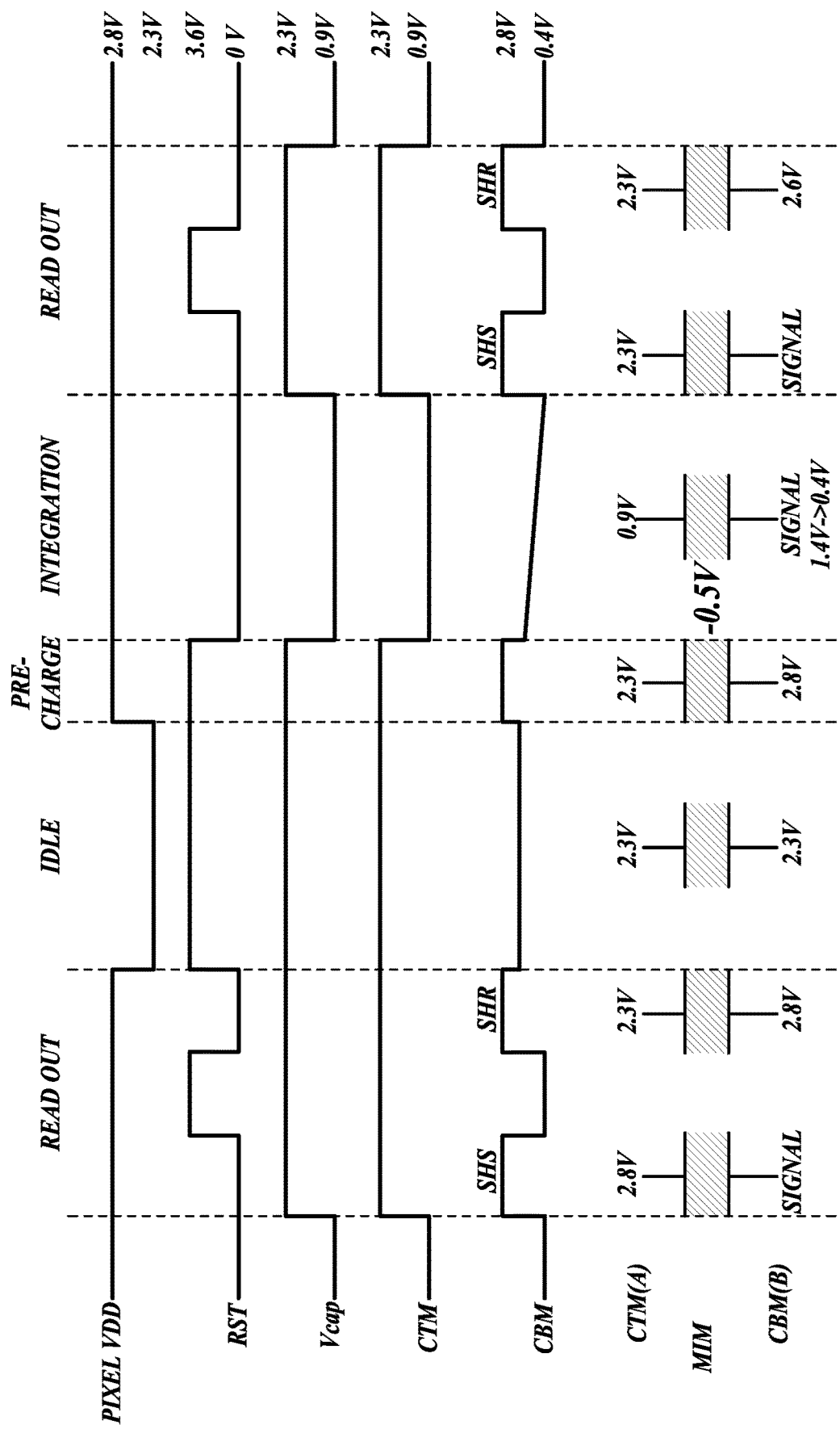
FIG. 6B is a timing diagram illustrating phases of image sensor operation in accordance with an embodiment of the present disclosure.

FIG. 6B is a timing diagram illustrating phases of image sensor operation in accordance with an embodiment of the present disclosure. FIG. 6B may show a timing diagram associated with exemplary pixel 210B illustrated in FIG. 6A. The bottom row of capacitor symbols illustrates voltages at the capacitor top metal electrode (CTM side or A-side) and capacitor bottom metal electrode (CBM side or B-side) during different periods of the pixel operation cycle: readout, idle, pre-charge, integration, on to the next readout, etc.). As before, the illustrated voltage range is from 0V to 2.8V, however, in different embodiments different ranges of voltage may apply.

In embodiments, during the idle period, both the CTM side (A-side) and the CBM side (B-side) of a LOFIC 215 in pixel 210B are configured to receive a common bias voltage value causing LOFIC 215 zero-biased allowing the LOFIC to discharge. For example, as illustrated in FIG. 6B, the CTM side (A-side) of the LOFIC 215 is set to 2.3V by closing the switch 236 coupling bias voltage VCAP to the CTM side (A-side) of the LOFIC 215 providing a first bias voltage value of 2.3V to the CTM side (A-side) of the LOFIC 215, while the CBM side (B-side) is also set to a second bias voltage value of 2.3V by enabling the reset transistor 214. In such embodiment, during the idle period, the LOFIC 215 is zero-biased such that the LOFIC 215 begin discharge process.

During the pre-charge or reset period, the CTM side (A-side) of the LOFIC 215 is set the first bias voltage value that is lower than the second bias voltage value applied to the CBM side (B-side) side of the LOFIC 215 such that the LOFIC 215 is reversed biased. For example, the CTM side (A-side) of the LOFIC 215 is set to the first bias voltage value of 2.3V through configuring the bias voltage VCAP and the CBM side (B-side) side of the LOFIC is set to the second bias voltage value of 2.8V through configuring a voltage level of the pixel reference voltage (e.g., voltage AVDD). In the beginning of the integration period, the CTM side (A-side) of the LOFIC 215 is set the first bias voltage value that is lower than the second bias voltage value applied to the CBM side (B-side) side of the LOFIC 215 such that the LOFIC 215 continues to be reversed biased. For example, in the beginning of the integration period, after the pre-charge (reset) is completed, the CTM side (A-side) of the LOFIC 215 is set to the first bias voltage value of 0.9V through configuring the bias voltage VCAP and the CBM side (B-side) side of the LOFIC is set to the second bias voltage value of 1.4V through configuring the pixel reference voltage (e.g., voltage AVDD). Thereafter, at the beginning of the integration period there is −0.5V voltage bias across the LOFIC 215 i.e., the LOFIC 215 is configured to be reversed biased at the beginning of the integration period. In the illustrated embodiments, the bias voltage VCAP may be configured in such manner that the first bias voltage value applied to the CTM side (A-side) of the LOFIC 215 during the integration period is lower than the first bias voltage value applied to the CTM side (A-side) of the LOFIC 215 during the pre-charge period to ensure target biasing voltage across the LOFIC 215 as well as needed voltage swing range for LOFIC read out voltage.

Charges may begin to accumulate in the LOFIC 215 during the integration period as the photodiode PD photo-generates charges in response to incoming light (e.g., under bright light condition), voltage value (e.g., the second bias voltage value) at the CBM side of the LOFIC 215 may begin to decrease to a lower value, for example 0.4V, such that the LOFIC 215 may become forward-biased at the end of the integration period due to the accumulation of the negative charge at the LOFIC 215. Accordingly, the LOFIC 215 changes its voltage biasing from −0.5V at the beginning of the integration period (BL) to 0.5V at the end of the integration period (BH). That is, the LOFIC 215 may be reversed biased at the beginning of integration period and become forward biased as the LOFIC 215 accumulates charges overflow from photodiode PD 211. This can compensate for or cancels residual charges accumulated in the LOFIC 215 (e.g., charges accumulated and trapped by insulation material of the LOFIC 215 during current or previous frames), thus can reduce LOFIC 215 discharge times and thereby reduce image lag associated with LOFIC 215. For example, image charge discharged from the LOFIC 215 accumulated during idle period and image charge discharged from the LOFIC 215 accumulated during forward-biased operation have opposite polarities and may compensate each other during the subsequent readout operation. As such, trapped charges released from insulation material of the LOFIC) can be reduced or eliminated in a manner that those trapped charges would not affect a read out voltage (signal) of the LOFIC 215 being read during the readout operation.

On the other hand, under the dark field conditions very little or no electrical charges are generated by the photodiode PD, and the LOFIC 215 retains its initial voltage biasing of −0.5V. It is appreciated that amount of charges that can be stored in LOFIC 215 is relating to biasing voltage applied across the LOFIC 215, therefore by reducing the bias voltage across the LOFIC 215, the amount of charges accumulated and stored in LOFIC 215 under dark light condition can be corresponding reduced compare to the illustration in FIG. 5B. As such, discharging time of LOFIC 215 can be shortened and reduce image lag issue associated with LOFIC 215 during the subsequent readout operation.

FIGS. 7A-7C illustrate sample signal voltages of high-k (high dielectric constant) metal-on-metal (MIM) LOFIC with respect to amount of charges accumulated in the LOFIC during integration period in accordance with embodiments of the present disclosure. FIGS. 7A-7C illustrate sample signal voltages of LOFIC employed in pixel 210B of FIG. 6A. As explained above, the above voltage values are given as non-limiting examples and in different embodiments the illustrated voltage values may vary, while still embodying the principles of operation that characterize these different embodiments.

FIG. 7A illustrates voltage of the CTM side (A-side) and the CBM side (B-side) side of a LOFIC (e.g., LOFIC 215 of FIG. 6A) at the end of the integration period in case of low signal (relative low light condition). Under this scenario, the CTM side of the LOFIC (e.g., LOFIC 215) is maintained at its initial value of 0.9V (first bias voltage value) throughout the integration period. Due to a relatively small amount of electrical charges generated by the photodiode PD during the integration period, the voltage (second bias voltage value) of the CBM side of the LOFIC (e.g., LOFIC 215) also remains unchanged at 1.4V or close to 1.4V. Therefore, the LOFIC (e.g., LOFIC 215) continues to be reversed-biased.

FIG. 7B illustrates voltages on the CTM side (A-side) and the CBM side (B-side) side of the LOFIC (e.g., LOFIC 215) at the end of the integration period under the scenario of medium level signal (medium brightness field). Here, an appreciable amount of electrical charges is generated by the photodiode PD (e.g., photodiode PD 211) during the integration period, therefore causing the second bias voltage value at the CBM side of the LOFIC (e.g., LOFIC 215) changes from 1.4V to 0.9V, which is equivalent to changing the voltage bias of the LOFIC (e.g., LOFIC 215) from −0.5V to 0V. That is, the LOFIC (e.g., LOFIC 215) is configured to operatively transit from reverse-biased operation to zero-biased operation.

FIG. 7C illustrates voltage values on the CTM side (A-side) and the CBM side (B-side) side of the LOFIC (e.g., LOFIC 215) at the end of the integration period under a scenario of high level signal (bright field). Here, relatively high amount of the electrical charges being generated by the photodiode PD (e.g., photodiode PD 211) that is overflow to the coupled LOFIC (e.g., LOFIC 215) during the integration period, causing the second bias voltage value at the CBM side of the LOFIC (e.g., LOFIC 215) to change from 1.4V to 0.4V, which is equivalent to changing the voltage bias of the LOFIC (e.g., LOFIC 215) from −0.5V to 0.5V. That is, the LOFIC (e.g., LOFIC 215) is configured to operatively transit from reverse-biased operation to forward-biased operation. Relevance of these ending biasing operation of the is discussed with reference to FIGS. 8A and 8B below.

Figure 8A:
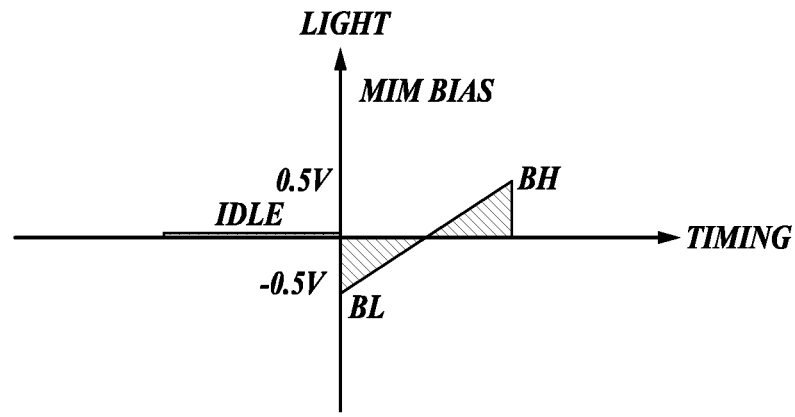
FIGS. 8A and 8B are timing graphs of LOFIC voltage biasing in accordance with embodiments of the present disclosure.
Figure 8B:
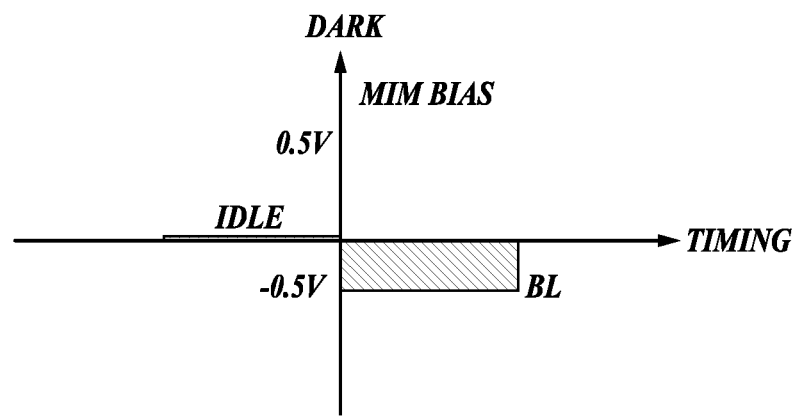

FIGS. 8A and 8B are timing graphs associated an example pixel (e.g., pixel 210B) in accordance with embodiments of the present disclosure. In particular, FIG. 8A illustrates change of the LOFIC voltage bias during the integration process under a relatively light (bright) condition of FIG. 7C above, while FIG. 8B illustrates voltage change of the LOFIC during the integration process under a relatively dark (low light) condition of FIG. 7A above. In both graphs, the horizontal axis represents time: idle time to the left of the coordinate origin and integration time to the right of the coordinate origin. The vertical axis represents voltage bias across the LOFIC, negative bias corresponding to the CTM side of the LOFIC having lower bias voltage value than that of the CBM side of the LOFIC, and positive bias corresponding to the CTM side of the LOFIC having higher value than the CBM side of the LOFIC. These voltage biases are representing as ranging from about −0.5V (BL) to about 0.5V (BH), however, these values should be understood as merely representative voltage values and other values are possible in different embodiments, depending on the design of the image sensor and voltages provided to different nodes of the image sensor circuitry.

FIG. 8A illustrates voltage bias change of the LOFIC during the integration process under a relatively light (bright) condition of FIG. 7C above. At the beginning of the integration process, voltage bias across the electrodes or plates of the LOFIC (e.g., LOFIC 215 of pixel 210B in FIG. 6A) is about −0.5V. As the LOFIC (e.g., LOFIC 215 of pixel 210B in FIG. 6A) accumulates electrical charge generated by the photodiode PD, the final voltage bias is about 0.5V at the end of the integration period. By allowing the LOFIC e.g., LOFIC 215 of pixel 210B in FIG. 6A) to transit from reversed-bias to forward bias can compensate for or cancels residual charges in the LOFIC thereby reduce image lag associated with LOFIC.

FIG. 8B illustrates voltage change across the electrodes or plates of LOFIC e.g., LOFIC 215 of pixel 210B in FIG. 6A) during the integration process under a relatively dark (low light) condition of FIG. 7A above. Just as in the case shown in FIG. 8A, the integration process starts at −05V bias across the electrodes or plates of the LOFIC. However, as the photodiode remains exposed to the dark field during the integration process, the photodiode photo-generates little or no electrical charges, thus the voltage bias of the LOFIC remains unchanged at −0.5V at the end of the integration period.

Since the LOFIC goes back at its 0V bias at the beginning of the next idle period, in either of the scenarios in FIGS. 8A (bright light) and 8B (dark field), the voltage bias across the plates of the LOFIC remains within a max range of −0.5V to 0.5V. In many embodiments, limiting the voltage bias across the CTM and CBM electrodes or plates of the LOFIC results in a smaller number of electrical charges accumulating on the electrodes or plates, because the charge of the capacitor (Q) is a product of capacitance (C) and biasing voltage magnitude (V) of a capacitor, i.e., Q=CV. When the voltage bias across the CTM and CBM electrodes or plates of the LOFIC is limited to about +/−0.5V, the charge Q of the capacitor is also reduced, in turn reducing the lag time of the capacitor. Therefore, at the beginning of the next idle process, the amount of lag accumulated by a LOFIC (e.g., a high-k MIM capacitor) is smaller, enabling a shortened idle time and an improved frame rate. Furthermore, since the LOFIC voltage bias during the idle period is about 0V, there is no need for complicated bias voltage VCAP controls that set voltage bias to certain predetermined values for certain amount of time during the idle period.

Embodiment 3

Figure 9:
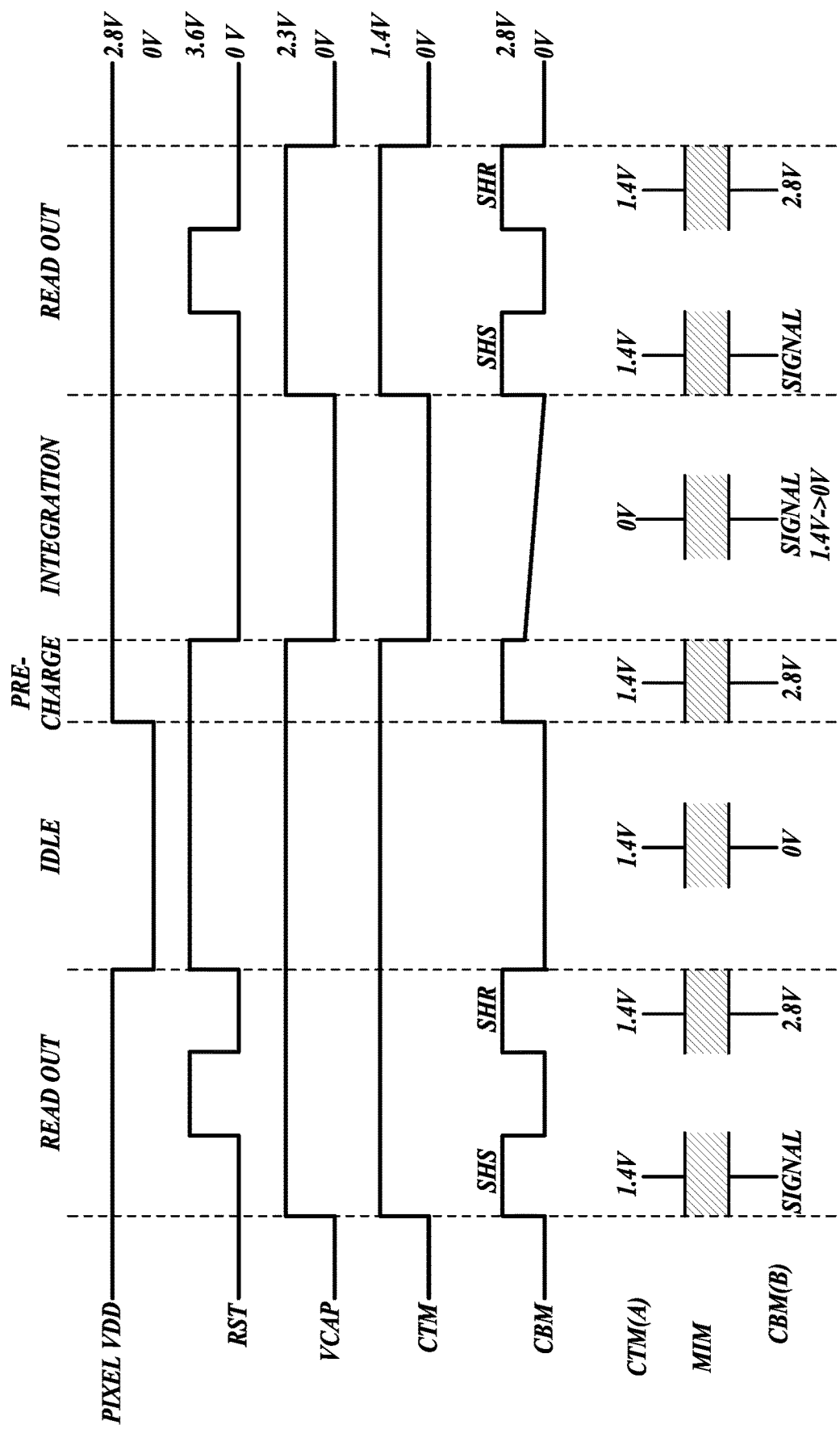
FIG. 9 is a timing diagram illustrating phases of image sensor operation in accordance with an embodiment of the present disclosure.

FIG. 9 is a timing diagram illustrating phases of image sensor operation in accordance with an embodiment of the present disclosure. FIG. 9 shows an example operation timing diagram for schematic circuit in FIG. 6A. The bottom row of capacitors illustrates voltages at the capacitor top metal electrode or plate (CTM side or A-side) and capacitor bottom metal electrode or plate (CBM side or B-side) for a LOFIC (e.g., LOFIC 215 of pixel 210B in FIG. 6A) included in the pixel circuit during different periods of the pixel operation cycle: read out, idle, pre-charge, integration, on to the next readout, etc. The illustrated voltage range during the integration period ranges from 2.8V to 0V, however, in different embodiments different voltages may be used.

In some embodiments, during the idle period, the CTM side (A-side) of a LOFIC (e.g., LOFIC 215 of pixel 210B in FIG. 6A) is set at a first bias voltage value of 1.4V by closing a switch (e.g., switch 236 of FIG. 6) coupling the CTM side of LOFIC (e.g., LOFIC 215 of FIG. 6A) to a bias voltage VCAP (provided from a bias voltage source), while the CBM side (B-side) is set to a second bias voltage value of about 0V, by enabling the reset transistor allowing the CBM side (B-side) of LOFIC to couple to a pixel reference voltage source such as a voltage source providing a pixel reference voltage (e.g., voltage AVDD). Therefore, during the idle period, the LOFIC (e.g., LOFIC 215 of FIG. 6A) is biased to about 1.4V. That is, the LOFIC (e.g., LOFIC 215 of FIG. 6A) is positively biased (forward-biased) during the idle period. During the pre-charged period, the LOFIC (e.g., LOFIC 215 of FIG. 6A) the CTM side (A-side) of the LOFIC (e.g., LOFIC 215 of FIG. 6A) may be continue set at 1.4V, while the CBM side (B-side) is set to about 2.8V causing the LOFIC (e.g., LOFIC 215 of FIG. 6A) to be reversed-biased compensating for or cancelling part of residue charges accumulated in the LOFIC (e.g., LOFIC 215 of FIG. 6A).

In the beginning of the integration period, after the pre-charge (reset) is completed, the CTM side (A-side) of the LOFIC is set to 0V (e.g., through configuring bias voltage VCAP) and the CBM side (B-side) of the LOFIC (e.g., LOFIC 215 of FIG. 6A) is set to 1.4V. That is, at the beginning of the integration period there is −1.4V bias across the plates of the LOFIC (e.g., LOFIC 215 of FIG. 6A) causing the LOFIC to be in reverse-biased. As the charge accumulates during the integration period when the photodiode PD is exposed to bright light, voltage value (e.g., second bias voltage value) at the CBM side of the LOFIC (e.g., LOFIC 215 of FIG. 6A) decreases to a lower value, for example about 0V, at the end of the integration period due to the accumulation of the negative charge photo-generated by the PD 211 at the LOFIC (e.g., LOFIC 215 of FIG. 6A). Therefore, the voltage biasing of the LOFIC (e.g., LOFIC 215 of FIG. 6A) changes from about −1.4V at the beginning of the integration period (reversed-biased) to about 0V (zero-biased) at the end of the integration period. However, under the dark field scenario, little or no electrical charges are generated by the photodiode PD, and the LOFIC (e.g., LOFIC 215 of FIG. 6A) retains its initial biasing of −1.4V. These two scenarios (bright field and dark field) are explained with reference to FIGS. 10A and 10B below.

Figure 10A:
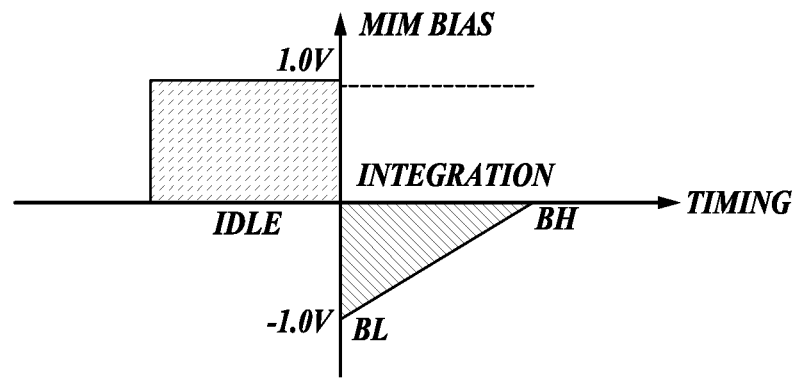
FIGS. 10A and 10B are timing graphs of LOFIC voltage biasing in accordance with embodiments of the present disclosure.
Figure 10B:
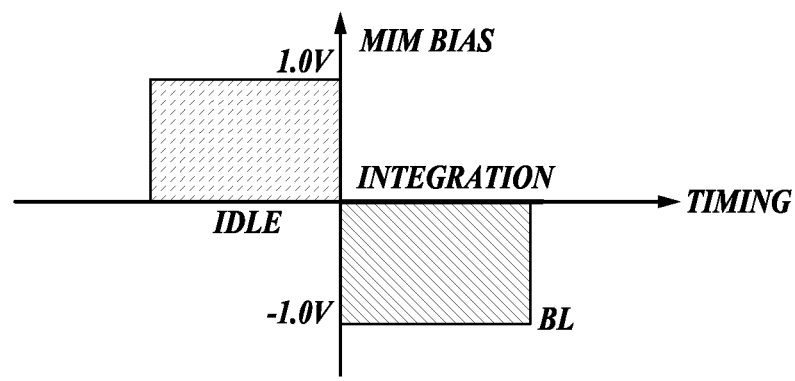

FIGS. 10A and 10B are timing graphs of LOFIC voltage biasing in accordance with embodiments of the present disclosure. FIG. 10A illustrates voltage change of the LOFIC (e.g., LOFIC 215 of FIG. 6A) during the integration process under a relatively light (bright) condition of FIG. 9 above, while FIG. 10B illustrates voltage change of the LOFIC during the integration process under a relatively dark (low light) condition of FIG. 9 above. In both graphs, the horizontal axis represents time: idle period to the left of the coordinate origin and integration period to the right of the coordinate origin. The vertical axis represents voltage bias across the CTM and CBM electrodes or plates of the LOFIC (e.g., LOFIC 215 of FIG. 6A). These voltage bias across LOFIC are representing as ranging from −1V to 1V, however, these values should be understood as merely representative voltage values and other values are possible in different embodiments.

FIG. 10A illustrates voltage change of the LOFIC (e.g., LOFIC 215 of FIG. 6A) during the integration period under a relatively light (bright) condition. During idle period preceding the integration period, the LOFIC (e.g., LOFIC 215 of FIG. 6A) is configured to have a positive 1V across the plates of the LOFIC causing the LOFIC to be forward-based. At the beginning of the integration period, voltage bias across the plates of the LOFIC is about −1V (BL). As the LOFIC (e.g., LOFIC 215 of FIG. 6A) accumulates charge generated by the photodiode PD, the final bias across LOFIC may decrease to about 0V (BH) at the end of the integration period. That is, the LOFIC is configured to be biased in opposite direction across the plates of the LOFIC during the idle period and the subsequent integration period such that residue charges in the LOFIC (e.g., LOFIC 215 of FIG. 6A) may be compensated stably maintaining a LOFIC read out voltage at the CBM side (B-side) of the LOFIC (or the join node between the reset transistor (e.g., reset transistor 214) and the lateral overflow gate transistor (e.g., lateral overflow gate transistor 234) during a readout period.

FIG. 10B illustrates voltage change across the plates of LOFIC (e.g., LOFIC 215 of FIG. 6A) during the integration period under a relatively dark (low light) condition. During idle period, the LOFIC (e.g., LOFIC 215 of FIG. 6A) is configured to have positive 1V across the plates of the LOFIC (e.g., LOFIC 215 of FIG. 6A) causing the LOFIC (e.g., LOFIC 215 of FIG. 6A) to be forward-based. Just as in the case shown in FIG. 10A, the integration period, the LOFIC (e.g., LOFIC 215 of FIG. 6A) is configured to become reversed biased with −1V bias across the electrodes or plates of the LOFIC (e.g., LOFIC 215 of FIG. 6A). However, as the photodiode remains exposed to the dark field during the integration, the photodiode generates little or no charges, thus the voltage bias of the LOFIC (e.g., LOFIC 215 of FIG. 6A) remains unchanged at about −1V at the end of the integration period. As such, charges accumulated during idle period and charges accumulated during the integration period have opposite polarities can compensate each other, e.g., cancelling trapped charges released from insulation material of the LOFIC (e.g., LOFIC 215 of FIG. 6A), thereby able to reduce image lag during a readout period thereafter in case of relatively dark scenery condition.

Since the voltage bias of the LOFIC (e.g., LOFIC 215 of FIG. 6A) goes back to −1V at the beginning of the idle period, in the case of dark condition of FIG. 10B the reversion of LOFIC's voltage bias from −1V as the end of the integration period to 1V at the beginning of the idle period accelerates discharging process of the LOFIC, thus reducing the lag time of the LOFIC. However, under the relatively light (bright) condition of FIG. 10A this reversion of the voltage bias of the LOFIC is not present. As a result, under the bright field condition the minimum idle period may still remain relatively long in comparison to the case described in FIG. 10B above.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention. In the context of this disclosure, the term "about," approximately" and similar means+/−5% of the stated value.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A method for reducing image lag associated with a pixel included in a plurality of pixels, the pixel comprising a photodiode, a first floating diffusion coupled to the photodiode through a transfer transistor, a second floating diffusion coupled to the first floating diffusion through a dual floating diffusion transistor, and a lateral overflow integration capacitor coupled between the second floating diffusion and a bias voltage source, and the lateral overflow integration capacitor being further coupled to a pixel reference voltage source through a reset transistor, wherein an operation of the pixel comprises an idle period and an integration period after the idle period, the method comprising:

configuring the lateral overflow integration capacitor to be either zero-biased or forward-biased during the idle period; and configuring the lateral overflow integration capacitor to be reversed-biased at least at a beginning of the integration period as the photodiode is exposed to a light.

2. The method of claim 1, wherein the lateral overflow integration capacitor includes an insulating region disposed between a first metal electrode and a second metal electrode, wherein the first metal electrode is selectively coupled to receive a first bias voltage from the bias voltage source, wherein the second metal electrode is selectively coupled to the pixel reference voltage source to receive a second bias voltage; wherein configuring the lateral overflow integration capacitor to be zero-biased during the idle period comprising:

coupling the bias voltage source to the first metal electrode of the lateral overflow integration capacitor providing the first bias voltage to the first metal electrode of the lateral overflow integration capacitor; and causing the reset transistor to turn on coupling the second metal electrode of the lateral overflow integration capacitor to the pixel reference voltage source providing the second bias voltage to the second metal electrode of the lateral overflow integration capacitor;

wherein the first bias voltage and the second bias voltage are configured to be the same.

3. The method of claim 2, wherein configuring the lateral overflow integration capacitor to be reversed-biased at the beginning of the integration period comprising:

configuring the first bias voltage to be lower than the second bias voltage at the beginning of the integration period.

4. The method of claim 3, comprising:

configuring the transfer transistor and the dual floating diffusion transistor such that image charges photogenerated by a photodiode overflow to the lateral overflow integration capacitor during the integration period causing the second bias voltage at the second metal electrode to decrease; and configuring the first bias voltage of the bias voltage source such that the lateral overflow integration capacitor is reversed-biased at the beginning of the integration period and becomes forward-biased at a later time during the integration period as the second bias voltage at the second metal electrode of the lateral overflow integration capacitor decreases to be less than the first bias voltage provided to the first metal electrode, wherein a forward-biasing voltage between the first metal electrode and the second metal electrode is set based on an amount of overflow image charges received from the photodiode.

5. The method of claim 4, wherein the forward-biasing voltage is configured to be equal to a reverse-basing voltage at the beginning of the integration period.

6. The method of claim 5, wherein the forward-biasing voltage is 0.5V.

7. The method of claim 1, wherein the lateral overflow integration capacitor includes an insulating region disposed between a first metal electrode and a second metal electrode, wherein the first metal electrode is selectively coupled to the bias voltage source, wherein the second metal electrode is selectively coupled to the pixel reference voltage source; wherein configuring the lateral overflow integration capacitor to be forward-biased during the idle period comprising:

coupling the bias voltage source to the first metal electrode of the lateral overflow integration capacitor providing a first bias voltage to the first metal electrode of the lateral overflow integration capacitor; and causing the reset transistor to turn on coupling the second metal electrode of the lateral overflow integration capacitor to the pixel reference voltage source providing a second bias voltage to the second metal electrode of the lateral overflow integration capacitor, wherein the first bias voltage is greater than the second bias voltage.

8. The method of claim 7, wherein when the lateral overflow integration capacitor is configured to be forward-biased during the idle period, the lateral overflow integration capacitor is configured to be reversed-biased during the integration period such that charges accumulated in the lateral overflow integration capacitor during the idle period and during the integration period compensate each other maintaining a read out voltage at the second metal electrode during a readout period occurred after the integration period.

9. The method of claim 1, wherein the operation of the pixel further comprises a pre-charge period between the idle period and the integration period, comprising during the pre-charge period, configuring a first bias voltage of the bias voltage source to be less than a second bias voltage of the pixel reference voltage source such that the lateral overflow integration capacitor is reversed-biased.

10. The method of claim 9, further comprising: configuring the first bias voltage in the integration period to be less than the first bias voltage in the pre-charge period.

11. An image sensor, comprising:
a plurality of pixels arranged in rows and columns of a pixel array, each pixel comprising:
a photodiode;
a first floating diffusion connected to the photodiode;
a transfer transistor connected the photodiode to the first floating diffusion;
a second floating diffusion;
a dual floating diffusion transistor coupled between the first floating diffusion and the second floating diffusion; and
a lateral overflow integration capacitor coupled between the second floating diffusion and a bias voltage source,
wherein the photodiode is configured to generate electrical charges during an integration period, and wherein the integration period is preceded by an idle period,
wherein an operation of the pixel comprises:
configuring the lateral overflow integration capacitor to be either zero-biased or forward-biased during the idle period; and
configuring the lateral overflow integration capacitor to be reversed-biased at least at a beginning of the integration period as the photodiode is exposed to a light.

12. The image sensor of claim 11, wherein the lateral overflow integration capacitor includes an insulating region disposed between a first metal electrode and a second metal electrode, wherein the first metal electrode is selectively coupled to receive a first bias voltage from the bias voltage source, wherein the second metal electrode is selectively coupled to a pixel reference voltage source to receive a second bias voltage; wherein configuring the lateral overflow integration capacitor to be zero-biased during the idle period comprising:

coupling the first metal electrode of the lateral overflow integration capacitor to the bias voltage source to receive the first bias voltage; and turning on a reset transistor coupling the second metal electrode of the lateral overflow integration capacitor to the pixel reference voltage source enabling the second metal electrode of the lateral overflow integration capacitor to receive the second bias voltage;

wherein the first bias voltage and the second bias voltage are configured to have a same voltage.

13. The image sensor of claim 12, wherein configuring the lateral overflow integration capacitor to be reversed-biased at the beginning of the integration period comprises:

configuring the first bias voltage to be lower than the second bias voltage at the beginning of the integration period.

14. The image sensor of claim 11, wherein the lateral overflow integration capacitor is a high-k (high dielectric constant) metal-on-metal (MIM) capacitor.

15. The image sensor of claim 11, wherein the lateral overflow integration capacitor includes an insulating region disposed between a first metal electrode and a second metal electrode, wherein the first metal electrode is selectively coupled to receive a first bias voltage from the bias voltage source, wherein the second metal electrode is selectively coupled to a pixel reference voltage source to receive a second bias voltage, wherein the operation of the pixel comprises:

configuring the transfer transistor and the dual floating diffusion transistor to allow image charges photo-generated by the photodiode overflow to the lateral overflow integration capacitor during the integration period causing the second bias voltage at the second metal electrode to decrease; and configuring the first bias voltage of the bias voltage source such that the lateral overflow integration capacitor is reversed-biased at the beginning of the integration period and becomes forward-biased at a later time during the integration period when the second bias voltage at the second metal electrode of the lateral overflow integration capacitor decreases to be less than the first bias voltage at the first metal electrode, wherein a forward-biasing voltage between the first metal electrode and the second metal electrode of the lateral overflow integration capacitor is set based on an amount of overflow image charges received from the photodiode.

16. The image sensor of claim 15, wherein the forward-biasing voltage is configured to be equal to a reverse-basing voltage at the beginning of the integration period.

17. The image sensor of claim 11, wherein the lateral overflow integration capacitor includes an insulating region disposed between a first metal electrode and a second metal electrode, wherein the first metal electrode is selectively coupled to the bias voltage source, wherein the second metal electrode is selectively coupled to a pixel reference voltage source, wherein the image sensor further includes a reset transistor coupled between the lateral overflow integration capacitor and the pixel reference voltage source; wherein configuring the lateral overflow integration capacitor to be forward-biased during the idle period comprises:

coupling the bias voltage source to the first metal electrode of the lateral overflow integration capacitor providing a first bias voltage to the first metal electrode of the lateral overflow integration capacitor; and causing the reset transistor to turn on coupling the second metal electrode of the lateral overflow integration capacitor to the pixel reference voltage source providing a second bias voltage to the second metal electrode of the lateral overflow integration capacitor, wherein the first bias voltage is greater than the second bias voltage.

18. The image sensor of claim 17, wherein when the lateral overflow integration capacitor is configured to be forward-biased during the idle period, the lateral overflow integration capacitor is configured to be reversed-biased during the integration period such that image charges accumulated in the lateral overflow integration capacitor during the idle period and during the integration period compensate each other maintaining a read out voltage at the second metal electrode of the lateral overflow integration capacitor during a readout period.

19. The image sensor of claim 18, wherein the operation of the pixel further comprises a pre-charge period between the idle period and the integration period, comprising during the pre-charge period, configuring the first bias voltage of the bias voltage source applied to the first metal electrode of the lateral overflow integration capacitor to be less than the second bias voltage of the pixel reference voltage source such that the lateral overflow integration capacitor is reversed-biased.

20. The image sensor of claim 19, further comprising: configuring the bias voltage source such that the first bias voltage provided by the bias voltage source in the integration period is less than the first bias voltage provided by the bias voltage source in the pre-charge period.

* * * * *

UNITED STATES PATENT AND TRADEMARK OFFICE
CERTIFICATE OF CORRECTION

PATENT NO. : 12,375,830 B2  
APPLICATION NO. : 18/488492  
DATED : July 29, 2025  
INVENTOR(S) : Yuanliang Liu et al.

Page 1 of 1

It is certified that error appears in the above-identified patent and that said Letters Patent is hereby corrected as shown below:

In the Claims

| Column | Line | |
|--------|------|---|
| 19 | 18 | Claim 5, delete "reverse-basing" and insert -- reverse-biasing -- |
| 21 | 10 | Claim 16, delete "reverse-basing" and insert -- reverse-biasing -- |

Signed and Sealed this  
Thirtieth Day of December, 2025

John A. Squires  
*Director of the United States Patent and Trademark Office*